BILATERAL SIGNAL TRANSMISSION SYSTEM HAVING
A COMBINED DYNAMIC RANGE CONTROL
AND ECHO SUPPRESSOR ARRANGEMENT
Filed Feb. 7, 1966
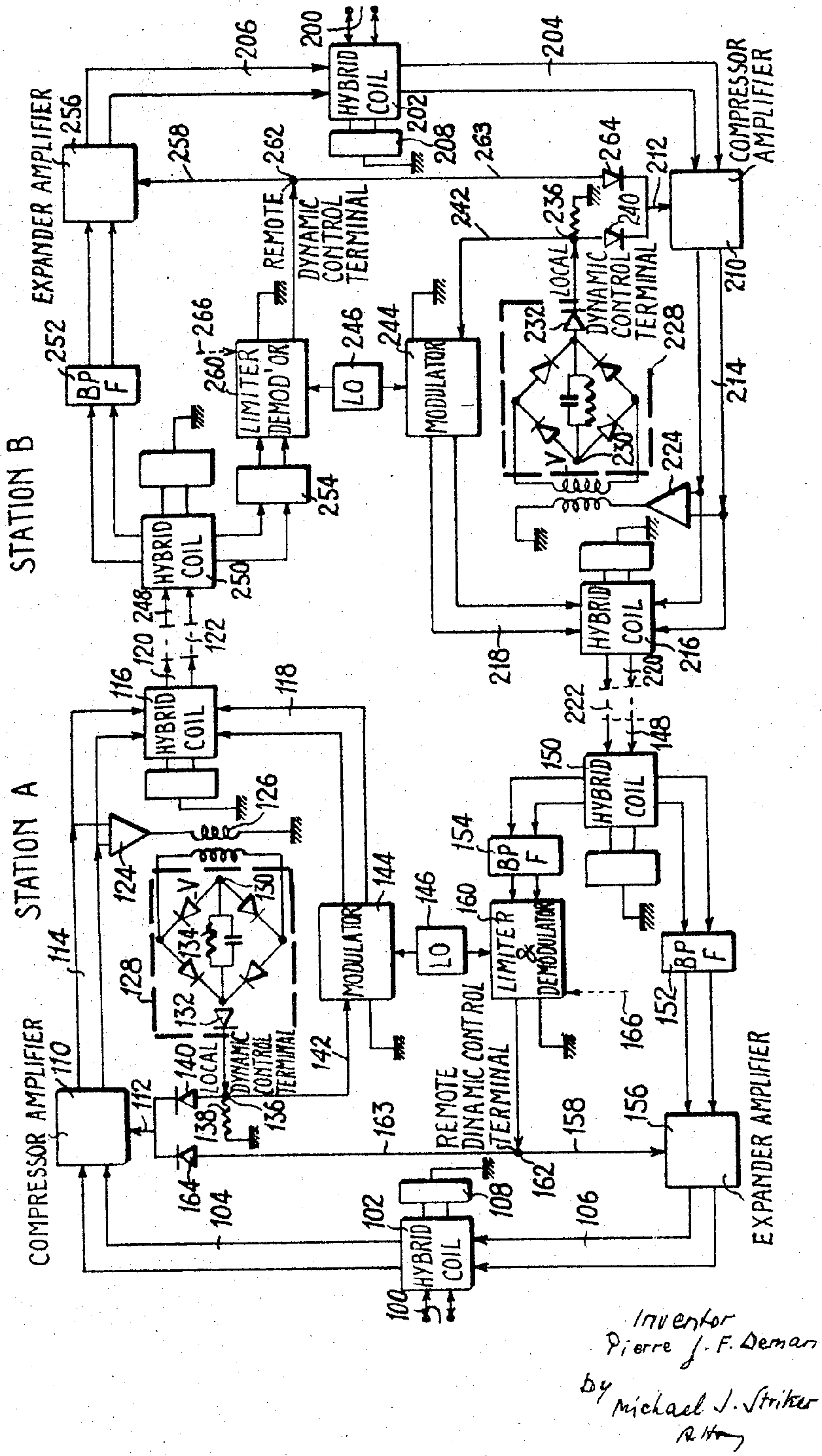
Inventor
Pierre J. F. Deman
by Michael J. Striker
Atty United States Patent Office 3,462,561
Patented Aug. 19, 1969

3,462,561
BILATERAL SIGNAL TRANSMISSION SYSTEM HAVING A COMBINED DYNAMIC RANGE CONTROL AND ECHO SUPPRESSOR ARRANGEMENT

Pierre J. F. Deman, Paris, France, assignor to Compagnie Francaise Thomson Houston-Hotchkiss-Brandt, Paris, France, a corporation of France Filed Feb. 7, 1966, Ser. No. 525,526
Claims priority, application France, Feb, 17, 1965, 5,889
Int. Cl. H04b 3/20; H04m 9/08
U.S. Cl. 179—170.4 9 Claims

ABSTRACT OF THE DISCLOSURE

An adjustable-gain device is connected in each of two one-way transmission paths. A local dynamic-control signal is derived from the amplitude of, and transmitted jointly with, an information signal in the outgoing path. A remote dynamic-control signal is derived from the amplitude level of the information signal on said incoming path. The received remote dynamic-control signal is applied to the adjustable-gain device in the incoming path so that the gain of the adjustable-gain device is proportional to the amplitude of the remote control signal. Further, the local control signal is compared with the remote control signal and the stronger of the two is applied to the out-going-path adjustable-gain device so that the gain of the adjustable-gain device is inversely propor tional to the stronger of the two control signals.

In two-way signal transmission systems, especially long-distance telephone links, considerable trouble is caused by echo effects. A voice signal transmitted from one terminal station over an outgoing one-way path, on reaching a remote station, is apt to be partly retransmitted over the other one-way path and return to the first station where it will be heard by the speaker as an echo of his own speech. Where the two-way propagation time exceeds one tenth of a second or so, such an echo has a disturbing effect on speech and impairs intelligibility.

This long-standing problem has led to the development of many different types of echo suppressor devices. A conventional echo suppressor generally comprises a pair of relays, or equivalent switching means, having their windings connected to the respective one-way circuits so as to be each energized by voice current flowing through the associated circuit, and acting to disable the other one-way circuit as by shorting it or introducing high attenuation into it.

As is well known, echo suppressors have introduced difficulties of their own. Because of the long time constants or "hangover time" of the switching means used in them, the particular subscriber who happens to be speaking holds virtual control over the two-way line until he chooses to make a pause. Interruption of one speaker by other, as is natural in conversation, is difficult or impossible. It will also sometimes happen that the echo suppressors associated with both one-way lines operate together, resulting in a so-called lock-out condition where both subscribers are speaking without either being able to hear the other. Heretofore, attempts at correcting these defects have only succeeded in achieving compromise solutions wherein much of the effectiveness of the echo suppressing action was impaired.

It is an object of this invention to provide an improved echo suppressing arrangement for bilateral signal tranmission systems which will intrinsically possess a very short time constant, thereby eliminating the above difficulties and enabling either subscriber to break in freely on the other and preventing the "lock-out" condition, while at the same time achieving fully effective echo suppression. Another object is to provide an echo suppressor arrangement that will be remarkably simple yet fully effective and extremely fast-acting, and insensitive to delays and disturbances sustained by the transmitted signals even in long-distance communication links.

Before disclosing the gist of the invention it is necessary to call attention briefly to yet another feature in wide use in present-day communication systems, namely dynamic range control. In a long-distance communication system it is customary to compress the amplitude range of the signals prior to transmission, by passing the signals through a variable-gain amplifier device and automatically controlling the gain of the device so as to reduce said gain for the larger-amplitude signals. At the receiver terminal, the received signal is passed through another variable-gain amplifier which is automatically controlled to re-expand the signals to their initial amplitude range. Such dynamic range control, as is well-known, permits more efficient transmission of the signals and increases the signal/noise ratio.

One advantageous form of transmission system using dynamic range control is known. In that system, the transmitted voice signals are passed through a variable-gain compressor amplifier on their way to the outgoing signal path. A dynamic control signal is derived from the outgoing voice signals in the form of a D-C voltage representing the speech signal energy as averaged over a short time itnerval. This dynamic control signal is applied locally to control the gain of the compressor amplifier to compress the volume range of the outgoing voice signal. The dynamic control signal is, moreover, combined with the outgoing voice signal (preferably in the form of a frequency-modulated signal) and transmitted simultaneously therewith. At the receiving station, the composite signal is separated into its voice component signal and dynamic control component signal. The voice signal is passed through a variable-gain expander amplifier, and the received dynamic control signal is used to vary the gain of this amplifier so as to re-expand the volume range of the received signal to its original value.

The advantage of such a dynamic range control arrangement, according to the applicant's earlier French patents, is that the dynamic control signal, since it is transmitted jointly with the voice signal as a composite signal, is subjected during transmission to all of the erratic delays and disturbances to which the voice signal may be subjected, so that there will be no relative disturbance between the main, voice, signal and the amplitude information conveyed by the dynamic control signal as received; higher fidelity is thus obtained.

The present invention is based on a recognition that a two-way transmission system using a dynamic range control signal transmitted jointly with the main information signal, as in the above-noted French patents, possesses certain inherent operating characteristics which make it possible to endow the system with a highly effective echo suppressing feature at the cost of very little additional equipment. The novel echo-suppressing method involves comparing, at a terminal station of the bilateral system, the "local" dynamic control signal as derived from the outgoing line, with the "remote" dynamic control signal as received on the incoming line, and applying the stronger of the two control signals to the compressor amplifier. As will be disclosed in detail hereinafter, this simple step can be made to achieve a fully effective echo-suppressing action.

The resulting echo suppressing arrangement can be readily carried out with the use of unidirectional conducting or gating elements such as diodes, having only negligible time constants. It completely eliminates the earlier requirements for relays or similar switching means, both complicated and slow-acting. The resulting echo-suppressing arrangement is not only advantageous because of its simplicity, but also because its negligibly low response time eliminates all of the earlier noted difficulties encountered in the use of conventional echo suppressors.

The invention is especially useful with long-distance radio telephone links, including those using satellite relays, but is of broad applicability.

An exemplary embodiment of the invention will now be described with reference to the accompanying drawing, which is a diagram, partly functional and partly in circuit schematic form, illustrating complementary equipment provided at two terminal stations A and B of a bilateral transmission link according to the invention.

Considering station A, this has a pair of terminals 100 connected to conventional telephone set equipment not shown, and connected through a two-wire circuit or line with one side of a conventional hybrid coil schematically indicated at 102. Hybrid coil 102 is further connected to a two-wire outgoing circuit or line 104, a two-wire incoming circuit or line 106 and a balancing network 108 to ground. In the usual manner, transmitted speech signals applied to telephone set terminals 100 are passed by hybrid coil 102 to the outgoing line 104, while received speech signals applied by way of incoming line 106 are passed through the hybrid 102 to the telephone terminals 100. Balancing network 108 serves to balance the impedance of the telephone circuit and ensure, in theory if not in practice, that half of the transmitted signal from terminals 100 is passed to outgoing circuit 104 and that half of the received signal from incoming circuit 106 is passed to the telephone terminals 100.

The transmitted signals passed to outgoing line 104 are applied to a conventional variable-gain amplifier device 110 serving as a compressor. This device has a gain-varying input 112 which is controlled, in a manner to be described, so as to hold the amplitude level of the signal appearing at the output line 114 from said device within a limited range regardless of variations in the input signal amplitude. The precise manner in which such control is exerted according to this invention will be later described, and it is sufficient at this point to understand that, in a generally conventional manner, the voltage at gain-control input 112 is varied so as to decrease the gain of device 110 in response to a rise in the output voltage above a prescribed level whereby to hold said output voltage within the prescribed range.

The amplitude-limited signal from compressor 110 is applied by line 114 to one input side of a hybrid coil 116 in which it is additively combined with an auxiliary signal, the character and function of which will be presently described, the auxiliary signal being applied to a second input side of hybrid 116 by a line 118. The composite signal appearing at the output side 120 of hybrid 116 is transferred by way of an outgoing transmission path generally designated 122 to terminal station B. It will be understood that the transmission channels or paths such as 122 with which the disclosed system is usable may be of any desired character including both cable and radio links, and may include any of the conventional signal transfer equipment therein, such as modulating means, frequency-change means, radiators, repeaters, and the like.

The signal from the output of compressor 110 is tapped from line 114 to the input of an amplifier 124 and the amplified output is applied through a coupling transformer 126 to a detector network generally designated 128. This network may, as shown, include a fullwave rectifier bridge having its input diagonal connected across the secondary of transformer 126. The output diagonal of the bridge has one, 130, of its terminals connected to a biassing potential —V (e.g. —10 v. in one practical embodiment), and its other terminal connected through a diode 132 to a junction 136 grounded through a resistor 138.

For reasons that will later appear, junction 136 is herein termed the Local Dynamic Control (or LDC) terminal An integrating network 134 consisting of a resistance and capacitance in parallel is connected across the output diagonal of the rectifier bridge. With the arrangement described, it will readily be understood that so long as the variable alternating voltage applied from line 114 through amplifier 124 and transformer 126 to the input of the full-wave rectifier bridge does not exceed a prescribed amplitude as determined by the fixed bias voltage —V, the output diode 132 will not pass current to the LDC terminal 136 and said terminal will be held at a low constant potential. Should the signal amplitude appearing on line 114 exceed the prescribed amplitude, as during loud speech of the station A subscriber, then diode 132 will pass current to increase the potential of LDC terminal 136 by a variable amount corresponding to the excess of the voice signal above the prescribed limiting amplitude. The variable D–C voltage appearing at LDC terminal 136 constitutes what is here called the Local Dynamic Control signal. This control signal is passed by a diode 140, the function of which will appear later, to the gain control input 112 of variable-gain compressor device 110, reducing the gain (or increasing the attenuation) through it by a corresponding amount, so as to introduce an attenuation substantially proportional to the local dynamic control signal voltage, in logarithmic units (decibels). The transmitted voice signal passed from compressor 110 through hybrid 116 to the outgoing transmission line 122 is thus maintained in the prescribed limited amplitude range as earlier indicated and as is generally conventional per se.

The local dynamic control signal appearing at LDC terminal 136 is further applied by a line 142 to the modulating input of a conventional frequency modulator 144 where it serves to frequency-modulate a local carrier wave applied to the moduland input of modulator 144 from a local oscillator 146. Modulator 144 thus produces a frequency-modulated, so-called auxiliary signal whose frequency-modulation component represents the dynamic control voltage currently applied to the gain-varying input 112 of compressor 110, and hence a measure of the instantaneous gain (or attenuation) value of said device, as measured in logarithmic units.

The auxiliary signal from modulator 144 is applied over line 118 to an input of hybrid 116 for addition to the transmitted voice signal as earlier indicated.

Turning now to the remote terminal station B, its construction is shown identical with that of station A, and the parts thereof are designated with the same reference numbers, plus one hundred, as the corresponding parts of station A. It will be noted that since this is a two-way two-channel transmission system, the circuit components in the two stations A and B are shown in reversed relationship so that the components in station B have the same relations to the lower transmission line 222 as have the components in station A to the upper transmission line 122.

A signal transmitted from station B over the lower (right-left) transmission line 222 constitutes, as will be evident from the foregoing description, a composite signal including a voice component of limited amplitude range as delivered by compressor device 210, plus a frequency-modulated auxiliary (dynamic control) signal delivered by modulator 244 and added to the voice signal in hybrid 216. The frequency modulation component in this remotely derived auxiliary signal represents the instantaneous value of the control voltage currently applied from the station B, LDC terminal 236, through diode 240, to the gain-varying input 212 of compressor 210.

This composite signal on arriving at station A is applied over line 148 to the input side of a hybrid coil 150, and is passed from the outputs of the hybrid to respective bandpass filters 152 and 154 which separate the composite signal into its main or voice component and its auxiliary or dynamic control component.

By way of indication, in one practical embodiment the voice signal may have a bandwidth of 300–3400 c.p.s., and the auxiliary signal a bandwidth of 4050–4150 c.p.s.

The main, voice, signal is passed from filter 152 to the input of a variable-gain device 156 serving as an expander to restore the full range of signal amplitudes or volumes applied from the input 200 of station B, the device 156 compensating for the amplitude compression introduced by compressor device 210 in a manner to be presently described. The re-expanded or restored voice signal from expander device 156 is applied through line 106 to the terminal hybrid 102 and is directed therethrough to the telephone terminals 100 as earlier noted.

The received, remotely-derived dynamic control signal from filter 154 is passed to a frequency demodulator or discriminator 160 where it is demodulated, after the usual amplitude limiting stage, with the original carrier frequency used for the transmission of said auxiliary signal. The demodulated signal constitutes what herein is termed the Remote Dynamic Control signal, and represents the control voltage present at LDC terminal 236 of the remote station B. This signal appears at the station A demodulator output junction 162 termed the Remote Dynamic Control (or RDC) terminal, and is applied to the gain-varying input 158 of expander 156.

In the operation of the system as so far described, it will be seen that the remote dynamic control signal appearing at RDC terminal 162 at station A, corresponds with the local dynamic control signal present at LDC terminal 236 at station B; and conversely of course the signal appearing at station B RDC terminal 262 corresponds with the signal present at station A LDC terminal 136. Thus, the gain through station A expander 156 can be maintained proportional to the attenuation (or inversely proportional to the gain) through station B compressor 210. As a result, the received voice signal delivered from expander 156 through hybrid 102 to the station A telephone terminals 100 can be maintained equal in amplitude level to that of the signal being transmitted through hybrid 202 from station B telephone terminals 200, despite the variable attenuation introduced by station B compressor 210.

The system constructed and operated as so far described is basically similar to that disclosed in applicant's earlier French Patent 1,094,338 and patent of addition 66,617. As there disclosed such a system possesses certain important advantages over more conventional two-way transmission systems using dynamic range control. These advantages follow chiefly from the use of a compoiste signal including both the main, voice, signal and the dynamic control signal component. Both of these components are thus subjected to identical disturbances, both in amplitude and phase (or time delay), throughout the transmission process. For example, short-term fluctuations in propagation conditions will identically affect both the voice signal and the dynamic control signal. This ensures higher fidelity in the dynamic amplitude control of the received signal than could be attainable with other types of compressor-expander (or so-called "compandor") systems.

However, this earlier system, like any other two-way signal transmission system using two-wire circuits, is open to the inconveniences caused by echo effect. Consider for example voice signal transmission over the A–B (upper) channel. The transmitted voice signal after reception at station B is passed from expander 256 to hybrid coil 202. Were this coil perfectly balanced by means of balancing network 208, the voice signal would be directed through the hybrid exclusively to the station B telephone terminals 200. As is well-known in the telephone art, however, some degree of mismatch is always present in any hybrid coil. Because of this, an appreciable portion of the voice signal applied over line 206 will be passed through line 204 to the return (lower) channel of the two-way system. Such spurious feedback signal is then treated as a true voice signal as though applied by station B subscriber to telephone terminals 200, and it would be passed through hybrid 102 to the station A telephone terminals 100. The station A subscriber will then hear an echo of his own voice at every syllable spoken by him. This is always an annoying experience and is liable to impair intelligibility in the case of long-distance links where propagation times are large and the echo returns to the speaker after a delay of 100 ms. or more.

Various ones of the many types of echo suppressors heretofore devised could conceivably be associated with the two-way signal system as described up to this point of the specification. Such conventional echo suppressors generally comprise a pair of relays having their windings connected to the respective one way lines of the two-way system, each relay being energized in response to voice current flowing through the associated line to disable the other one-way line, as by shorting it or introducing a high loss into it. Such echo suppressors are complicated, liable to malfunction, and have long time constants which result in the well-known difficulties noted above, including the difficulty for either subscriber to interrupt the other and the occurrence of lock-out situations in which neither speaker can hear what the other is saying.

In accordance with the present invention, advantage is taken of the inherently complementary relationship present between the "local" and the "remote" dynamic control signals in a dynamic-range control system of the type disclosed above, in order to achieve a highly effective echo suppression arrangement that will be both simple and fast-acting and therefore free from the above noted deficiency of prior echo suppressors.

As shown, at station A the Remote Dynamic Control terminal 162 is connected by a conductor 163 including a diode 164 therein, with the gain varying input 112 of compressor 110, in parallel with the diode 140 earlier referred to as being connected to the Local Dynamic Control terminals 136. An identical arrangement, correspondingly numbered, is provided at station B.

With this arrangement it will be seen that the gain-control input 112 (212) of compressor 110 (210) has applied to it the voltage present at the LDC terminal 136 (236) or the voltage present at the RDC terminal 162 (262), depending on which of the two voltages is the higher. Assume speech is being transmitted in the A–B direction over upper line 122. A local dynamic control voltage of substantial magnitude is then present at the LDC terminal 136 of station A, and the same signal also acts to generate a remote dynamic control signal voltage of corresponding magnitude at the RDC terminal 262 of station B. On the other hand, the voltages at both control terminals 236 and 162 are at this time low.

Station A compressor 110, therefore, receives its gain-varying voltage through diode 140 from LDC terminal 136 while station B compressor 210 receives its gain-varying voltage through diode 264 from RDC terminal 262. The relatively high voltage applied from RDC terminal 262 through diode 264 to control input 212 acts to reduce the gain (increase the attenuation) in station B compressor 210, thereby "compressing" or reducing the amplitude of any spurious signal that may tend to be transferred from station B hybrid 202 over line 204 due to imperfect balancing of the hybrid. Owing to this compression of the spurious signal, the compressor output voltage as detected by rectifiers 228 remains less than the bias voltage −V at terminal 230. Hence diode 232 remains non-conducting and LDC terminal 236 remains at ground-potential. The dynamic control signal, therefore, will not provoke any increase in the gain of station A expander 156. The spurious signal therefore is not expanded in the station A expander and produces no echo.

It will be apparent moreover that owing to the provision of the diodes 164, 264, the normal control of the expanders 156, 256 by the Remote Dynamic Control signal from RDC terminal 162 or 262 will remain unimpaired and will proceed in the way earlier described to restore any received voice signal to its original volume range.

To ensure correct operation in the manner just described, in accordance with an important feature of the invention, both compressor amplifiers 110 and 210 have identical gain characteristics, and both expander amplifiers 156 and 256 also have identical gain characteristics reciprocally related to the gain characteristics of the compressor amplifiers. By this latter statement is meant that a given dynamic control signal voltage applied to the gain-varying input of either compressor amplifier and to the gain-varying input of the related expander amplifier, imparts reciprocal values to the gain through the respective amplifiers, or in other words gain values such that their product is unity. Furthermore, the gain of each of the dynamic control signal channels from the LDC terminal 136 (236) of one station to the RDC terminal 262 (162) of the other station is so adjusted, with a value of unity, that the control signal potentials appearing at both control terminals 136 and 262 (236 and 162) at both ends of each channel are equal, for a given value of the D-C control voltage applied to the input of the channel from the associated bridge rectifier 128 (228). Such full reciprocity condition is met if, for a given variation in control voltage, there correspond identical gain and attenuation ratios; in other words, the gains expressed in decibels must be proportional to the control voltage.

To provide for this last feature, any suitable means may be used for adjusting the gain through each of the dynamic control signal channels, e.g. the gain of the frequency demodulators or discriminators 160 and 260, as schematically indicated by the adjusting inputs 166 and 266.

The precise manner of operation of the invention, as described above, may be more clearly understood from the following summary numerical example.

Speech is assumed to be transmitted in the A–B direction. Consider a voice signal applied at a given instant to the station A telephone set terminals 100, and call zero decibel the reference energy level of such signal. The incoming signal on traversing the hybrid 102 sustains an attenuation of, say, 4 db, so that the signal level at the input to compressor 110 is −4 db. Assume the constants of the circuits components including amplifiers 110 and 124 and transformer 126 are so adjusted that the signal through compressor 110 produces a D-C voltage drop of 13 volts across the output diagonal of bridge rectifier 128, and that the bias voltage −V applied to bridge terminal 130 is −10 v. Then the control voltage applied by diode 132 to the LDC terminal 136 equals (13−10)=3 volts. This 3-volt local control voltage, applied to gain-control input 112, places compressor 110 in a corresponding gain condition in which the −4 db input level is amplified to the initial 0 db level.

The 3-volt control signal at LDC terminal 136, moreover, after transmission through the dynamic control signal channel including modulator 144, adder 116, line 122, hybrid coil 250 and demondulator 260, produces a remote signal voltage of 3 volts at RDC terminal 262, in view of the above-mentioned unity gain adjustment of said dynamic control signal channel. This 3-volt remote control voltage applied to gain-control input 258 of expander 256, controls the expander to provide an output signal level of +4 db on line 206, which after attentuation in hybrid 202 provides the desired 0 db level at telephone terminals 200.

Assuming now that hybrid 202 is imperfectly balanced, a spurious feedback signal appears on line 204. Such spurious signal may have a level of, say, −14 db, or 10 db below the −4 db level of a voice signal passed through hybrid 202 to line 204 if the station B subscriber were applying of 0 db reference level to terminals 200. Under these conditions, the D-C voltage derived across the output diagonal of rectifier 228 from compressor 210 and applied to LDC terminal 236 will be considerably less than the 10 volt threshold required to overcome the bias on bridge terminal 230, and LDC terminal 236 remains substantially at zero potential.

Since the higher of the two voltages present at the LDC and RDC terminals is applied to gain-control input 212, it is the 3-volt potential from RDC terminal 262 which is controlling and places amplifier 210 in a minimum-gain (maximum attenuation) condition. The spurious feedback signal is therefore amplified from the −14 db level to a level of only −10 db. In the absence of the connection 263, compressor amplifier 210, receives from the line 204, the −14 db echo signal but the 3-volt potential is not applied to control input terminal 212. At the commencement of application of the −14 db echo signal to compressor amplifier 210, the control voltage is therefore zero and brings about no attenuation on the signal which emerges on the line 214 at −14 db. At this moment the voltage applied to rectifier 228 exceeds its threshold value and a voltage appears at its output terminal 236, this voltage, due to the non-attenuation of the compressor amplifier 210 is equal to 3 volts by reciprocating with the first case where connection 263 is present and the attenuation was controlled by a potential of 3 volts. There now appears at terminal 212 the 3 volt potential which is reduced by the drop in voltage across diode 240 (i.e. about 2.25 volts). This does not occur where diodes 240–264 compensate one another. This 2.25 volt potential would adjust the gain of compressor 210 to a value producing a regulated output voltage of 0 volt at the output of said compressor. Moreover the 3 volt potential present at point 236 controls the modulator 244 which delivers a dynamic-control signal corresponding to 3 volts. In such circumstances the station A expander 156 would in turn have its gain adjusted from the RDC terminal 162 so as to deliver an output signal at a level of −6 db and would fiinally produce a −10 db echo at the output of hybrid 102 on telephone line 100.

In contrast with the system described, since the voltage at LDC terminal 236 is zero, modulator 244 is inoperative to modulate the local frequency from oscillator 246, and the dynamic control signal transmitted over line 222, after separation and demodulation at station A, applies a zero voltage to the RDC terminal 162 of station A. This zero control voltage applied to control input 158 of expander amplifier 156 places the amplifier in a minimum-gain (maximum-attenuation) condition too, thereby positively blocking the spurious feedback signal at its low −10 db level.

Assuming the total regulation range is 40 db, the maximum attenuation of expander 156 is such that the −10 db output signal therefrom is attenuated to an output level of −46 db, and the level of the resulting final echo signal at telephone terminals 100 will be −50 db, that is, 40 db below the level of the echo that would occur in the absence of the echo-suppressing connection 263–264 of the invention, as described in the preceding paragraph.

The dynamic control signals disclosed in the system as applied to the LDC terminals represent the average signal energy through the respective compressor amplifier over an integration period of, say 20 or 30 milliseconds, as is well-known in the art. The operation of the echo-suppressing circuits of the system is correspondingly rapid.

It will be apparent from the foregoing that the invention has provided an improved bilateral transmission system incorporating an extremely advantageous, integrated, dynamic-control and echo-suppressor arrangement.

The echo suppression action is based on a novel principle which essentially involves a comparison of two control voltages (the local dynamic control voltage and the remote dynamic control voltage), at each station, by means of a simple diode gate.

Thus the echo suppressor of the invention requires but a small amount of very simple additional equipment (essentially the diode gates) over what is required for the dynamic range control. All relay switches and the like are completely eliminated. This reduces the weight and bulk of the system, risk of malfunction, and cost of manufacture and maintenance.

At the same time the novel echo suppressor is inherently fast-acting since it includes none of the long-time-constant devices which were standard in conventional echo suppressors. As a consequence the improved two-way transmission system possesses greater flexibility in use than conventional such systems embodying echo suppressors. Thus, the subscribers are able to interrupt each other freely, lock-out conditions cannot occur, and yet effective echo suppression is maintained at all times.

What I claim is:

1. In a two-way transmission system having an outgoing one-way path and an incoming one-way path for information signals, the combination comprising:

an adjustable-gain device connected in each of said one-way paths;

means connected to the outgoing path and responsive to the level of an information signal therein for deriving a local dynamic-control signal;

means for transmitting said local dynamic-control signal jointly with an information signal over said outgoing path;

means for receiving an information signal and a remote dynamic-control signal over said incoming path;

means for applying the received remote dynamic-control signal to said incoming-path adjustable-gain device to increase the gain therethrough with increase in said remote control signal;

means for comparing said local control signal with said remote control signal and means applying the stronger of the two control signals to the outgoing-path adjustable-gain device to decrease the gain therethrough with increase in said stronger of the two control signals;

whereby said outgoing- and incoming-path adjustable-gain devices will act respectively to compress and expand the dynamic range of information signals transmitted and received over said outgoing and incoming paths and will further act to suppress spurious feedback signals transferred over the respective paths.

2. A system according to claim 1, wherein the means comparing the local and remote control signals and applying the stronger one thereof to the outgoing-path adjustable-gain device comprises a pair of unidirectional conducting devices, having corresponding terminals connected to receive said respective control signals and having their other corresponding terminals connected in common to a gain-adjusting input of said outgoing-path adjustable-gain device.

3. A system according to claim 1, including means for modulating a local carrier frequency with said local dynamic-control signal, means for combining the modulated carrier frequency with said information signal to produce said composite signal transmitted over the outgoing path, means for separating the received dynamic-control signal from a composite signal received over the incoming path, and means for demodulating the separated remote dynamic-control signal with said local carrier frequency.

4. A system according to claim 3, wherein said modulating and demodulating means comprise frequency-modulation means.

5. A system according to claim 1, wherein said adjustable-gain devices are arranged to have the gains thereof varied in reciprocal relation to each other in response to a common control signal applied thereto.

6. A system according to claim 1, further comprising means for adjusting the gain of said dynamic-control signal paths in such a manner that the over-all gain of each of said paths is substantially equal to unity.

7. A system according to claim 1, wherein each of said signal paths is a two-wire circuit and including a hybrid coil for connecting both the outgoing and incoming two-wire circuits with a two-wire circuit for the input and output of said information signals.

8. A system according to claim 7, wherein said information signals are voice signals.

9. In a two-way transmission system having an outgoing and an incoming one-way path for information signals, the combination comprising: a signal amplitude compressor connected to said outgoing path, a signal amplitude expander connected in the incoming path; means connected to the outgoing path for deriving a dynamic-control signal indicative of the amplitude of a transmitted information signal; means for applying said dynamic-control signal locally to said signal amplitude compressor for compressing the dynamic range of a transmitted information signal; means for transmitting said dynamic-control signal jointly with said information signal over said outgoing path; means for receiving information signals and a remotely derived dynamic-control signal over said incoming path; means for applying the received remotely derived dynamic-control signal to said signal amplitude expander for reexpanding the dynamic range of the received information signal; means for generating an additional control signal if the amplitude of the transmitted information signal in said outgoing path is below a predetermined level, indicating the absence of a transmitted information signal; and means responsive to said additional control signal for applying said received remotely-derived dynamic-control signal when present, to said signal amplitude compressor in addition to applying it to said signal amplitude expander, whereby any echo signals tending to be transmitted over said path will be suppressed.

References Cited

UNITED STATES PATENTS

| | | | |
|---|---|---|---|
| 2,825,764 | 3/1958 | Edwards et al. ---- | 179—170.2 |
| 3,183,313 | 5/1965 | Cutler ----------- | 179—170.4 |

KATHLEEN H. CLAFFY, Primary Examiner

W. A. HELVESTINE, Assistant Examiner

U.S. Cl. X.R.

179—170.2, 170.8